(12) United States Patent
Johanning et al.

(10) Patent No.: US 7,084,750 B2
(45) Date of Patent: Aug. 1, 2006

(54) COUNTERBALANCE ANNULAR TIRE TRANSPONDER ASSEMBLY AND METHOD

(75) Inventors: Gregory Scott Johanning, Canton, OH (US); Joseph Carmine Lettieri, Stow, OH (US); Brian Matthew Logan, Akron, OH (US); Gary Edwin Tubb, Copley, OH (US); James Michael Hart, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 6 days.

(21) Appl. No.: 10/959,554

(22) Filed: Oct. 6, 2004

(65) Prior Publication Data

US 2006/0071767 A1    Apr. 6, 2006

(51) Int. Cl.
*B60C 23/00* (2006.01)
(52) U.S. Cl. .................. 340/447; 340/445; 73/146.5; 116/34 R; 152/154.1
(58) Field of Classification Search ............... 340/447
See application file for complete search history.

(56) References Cited

U.S. PATENT DOCUMENTS

| | | | |
|---|---|---|---|
| 6,662,642 B1 * | 12/2003 | Breed et al. | 73/146 |
| 6,772,505 B1 | 8/2004 | Logan et al. | 29/600 |
| 6,822,582 B1 * | 11/2004 | Voeller et al. | 340/933 |

FOREIGN PATENT DOCUMENTS

| | | |
|---|---|---|
| EP | 1447244 | 8/2004 |
| WO | 0136221 | 5/2001 |

* cited by examiner

*Primary Examiner*—Donnie L. Crosland
(74) *Attorney, Agent, or Firm*—Richard B. O'Planick

(57) ABSTRACT

An annular antenna and transponder are affixed to a tire using the transponder as a counterweight to offset tire imbalance. The annular antenna is attached to an inner tire surface and is coupled electrically to a transponder device and is fixed relative to a housing in which the transponder device is packaged. The mass of the transponder housing is used specifically to counterbalance tire imbalance by first ascertaining the position at which a counterbalance would prove to be beneficial and then affixing the annular assembly to the tire so as to position the mass of the transponder housing at the optimal location for counterbalancing benefit.

8 Claims, 10 Drawing Sheets

COUNTERBALANCE ANNULAR TIRE TRANSPONDER ASSEMBLY AND METHOD

FIELD OF THE INVENTION

The invention relates generally to an annular apparatus, including an antenna and a transponder, useful in a tire for the purpose of transmitting tire or wheel data and, more specifically, to the method of assembly thereof.

BACKGROUND OF THE INVENTION

It is common to employ annular apparatus, including an antenna, for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

It is known in the art to employ an annular antenna to transmit, at radio frequencies, data from a transponder contained within the structure of a tire or tire and wheel assembly. The antenna and transponder may be incorporated into a tire during "pre-cure" manufacture. In practice, however, it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity and the mechanical connection between the antenna and transponder package during the diametric enlargement of the tire during its manufacture. Once assembled into the tire, any detected malfunction in the antenna, transponder, or antenna to transponder connection that cannot be repaired destroys the utility of the tire and may necessitate a scrapping of the tire. Hence, placement of an annular antenna-transponder assembly into a tire during its manufacture carries risk that subsequent failure or breakage of assembly components will necessitate the destruction of the otherwise suitable host tire.

Not only is the risk of damage to an annular antenna-transponder system present during its incorporation into a tire during manufacture, but damage to such systems are not uncommon from operation of the tire on a vehicle. Loop antennas in known tire pressure monitoring systems have heretofore been placed into the tire during the curing process either at the crown of the tire, the bead of the tire, or the sidewall. Antennas and transponders located in the crown are subjected to substantial compressive strain and at the sidewall a high strain amplitude. Such locations represent high load and deformation regions of the tire. Consequently, antenna, transponders, and the connections therebetween in such locations are prone to breakage and mechanical or electrical failure.

Because of the nature of the tire building process, it is not uncommon for a manufactured tire to have an imbalance that will eventually require an offset through the use of a counterbalancing weight. An annular antenna-transponder system likewise represents an imbalanced system in that the weight distribution resulting from the transponder package is asymmetrical. The weight of the transponder or sensor, when attached to a tire, can reinforce the inherent imbalance of the tire and create the need for increased counterweighing measures.

A need therefore exists for a method and apparatus for mounting a transponder module in a pneumatic tire in such a manner that the transponder does not exacerbate the inherit imbalance of the tire.

Still a further need exists to provide a method for mounting a transponder module in a pneumatic tire at any point in the tire manufacturing process in a manner that will enhance tire performance and longevity.

In addition, a need exists to provide a method for attaching an annular apparatus including an annular antenna and transponder in a cost effective and efficient manner.

SUMMARY OF THE INVENTION

The subject invention satisfies the needs of the industry for an improved annular apparatus and method for affixing a transponder to a tire. According to one aspect of the invention, a tire having an annular antenna and transponder apparatus is provided. The tire is analyzed to determine the location of tire imbalance. The annular transponder apparatus is attached to the tire in such a manner to strategically place the transponder to offset the imbalance of the tire. A method of attaching the antenna and transponder apparatus is provided as a further aspect of the invention, comprising the steps: identifying the location of tire imbalance in a tire; attaching an annular antenna and transponder assembly to the tire so that the transponder is placed to offset the imbalance of the tire.

The advantages of the invention, which will be apparent to those skilled in the art, are achieved by preferred and alternative embodiments that are described in detail below and illustrated by the accompanying drawings.

DEFINITIONS

Figure 1:
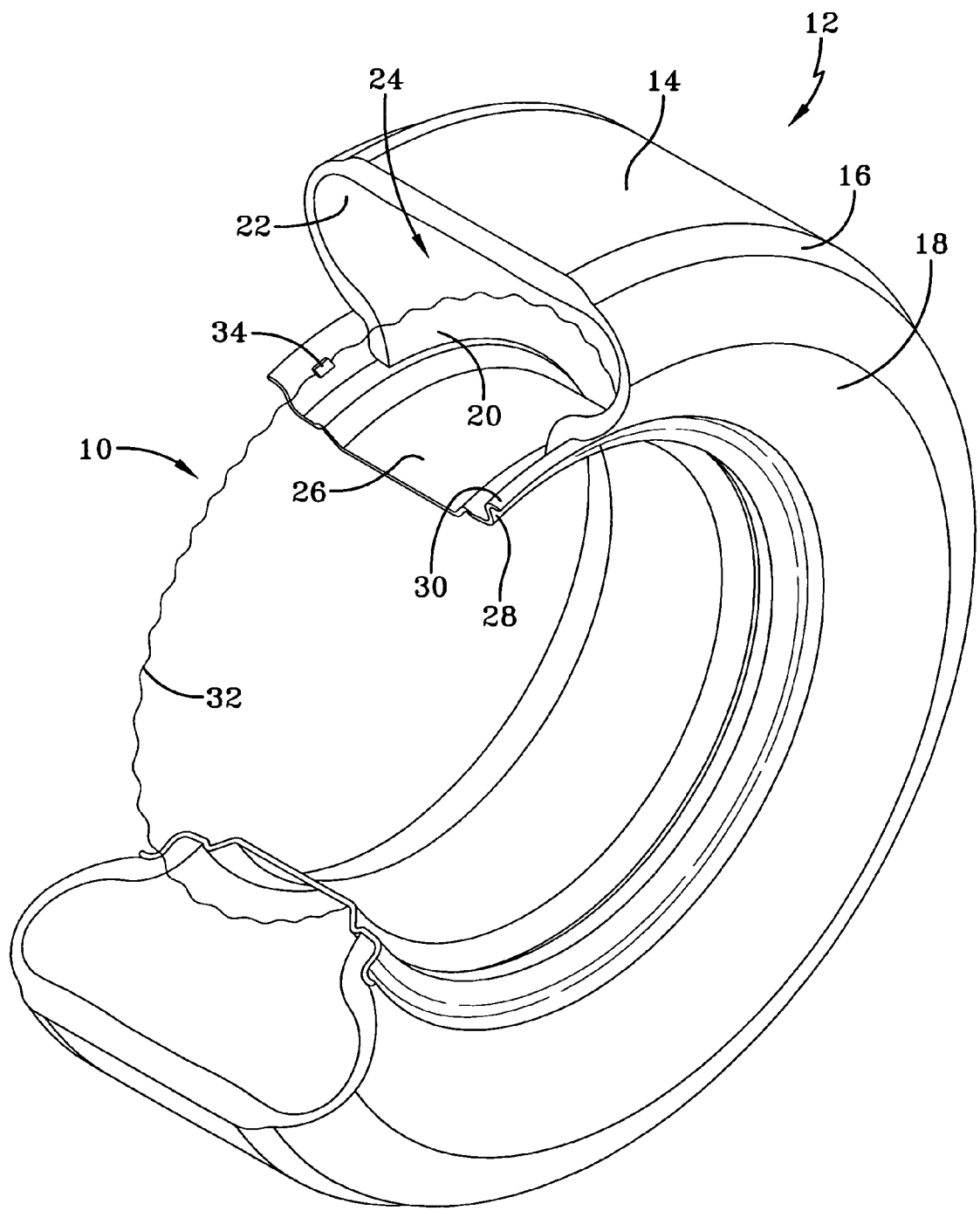
FIG. 1 is a perspective view of a tire and the subject annular apparatus with portions of the tire removed for the purpose of illustration.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements.

"Circumferential" most often means circular lines or directions extending along the perimeter of the surface of the annular tread perpendicular to the axial directs; it can also refer to the direction of the sets of adjacent circular curves whose radii define the axial curvature of the tread, as viewed in cross section.

"Inner" means toward the inside of the tire and "outer" means toward its exterior.

"Lateral" means in a direction parallel to the axial direction.

"Radial" and "radially" mean directions radially toward or away from the axis of rotation of the tire.

"Shoulder" means the upper portion of sidewall just below the tread edge.

"Sidewall" means that portion of tire between the tread and the bead.

DETAILED DESCRIPTION OF THE PREFERRED EMBODIMENTS

As used herein, a "transponder" is an electronic apparatus (device) capable of monitoring a condition such as air pressure within a pneumatic tire, and then transmitting that information to an external device. The external device can be either an RF (radio frequency) reader/interrogator or, simply an RF receiver. A simple receiver can be used when the transponder is "active", and has its own power source. A reader/interrogator would be used when the transponder is "passive" and is powered by an RF signal from the reader/interrogator. In either case, in conjunction with the external device, the transponder forms a component of an overall tire-condition monitoring/warning system. A toroidal body composed of a material of high electromagnetic permeability is coupled to the transponder by a winding. In conventional systems, the antenna is coupled to the toroidal body by means of a primary winding and the transponder is coupled to the toroidal body by means of a secondary winding. As explained below, the primary winding may be eliminated. The "secondary" winding that couples a transponder to the toroidal body hence is referred to herein as merely the "winding". For the purpose of the subject disclosure and the invention, the annular system is not transponder specific. That is, a wide range of commonly available transponders, sensors, and associated electronics may be packaged and utilized with the subject invention.

As used herein, a "toroid" is a body formed from material having a high elector-magnetic permeability by a continuous curved surface and includes a central through bore. The toroidal body may be cylindrical, oblong, symmetrical, or asymmetrical without departing from the invention herein set forth. As used herein, a "toroidal body" thus includes a transformer having one or more windings.

In order to send or receive RF signals, a transponder must have an antenna. The antenna is annular in configuration in the subject invention and may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The antenna may comprise a single wire or a plurality of strands. Various commercially available transponders, sensors, and other electrical devices deployed in combination with an annular antenna formed from conventional conductive materials are suitable for use in conformance with the principles of the subject invention.

Acceptable materials for the antenna wire include steel, aluminum, copper or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, flexible circuits, conductive film, conductive rubber, etc.

Referring initially to FIG. 1, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use explained below.

With continued reference to FIG. 1, a transponder module 34 of the general type described above is provided and may include means for sensing tire parameters such as pressure and temperature. Shown is an optional carrier strip of material 36 formed into the annular configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the transponder module 34 in the manner described below. In the post manufacturing state, therefore, the apparatus 10 comprises an annular bare wire antenna 32, transponder module 34 in a unitary, generally circular, semi-rigid assembly that is readily transportable and handled for attachment to tire 12. The diameter of the apparatus assembly 10 is a function of the size of the tire 12 and the preferred attachment location thereon.

Figure 2:
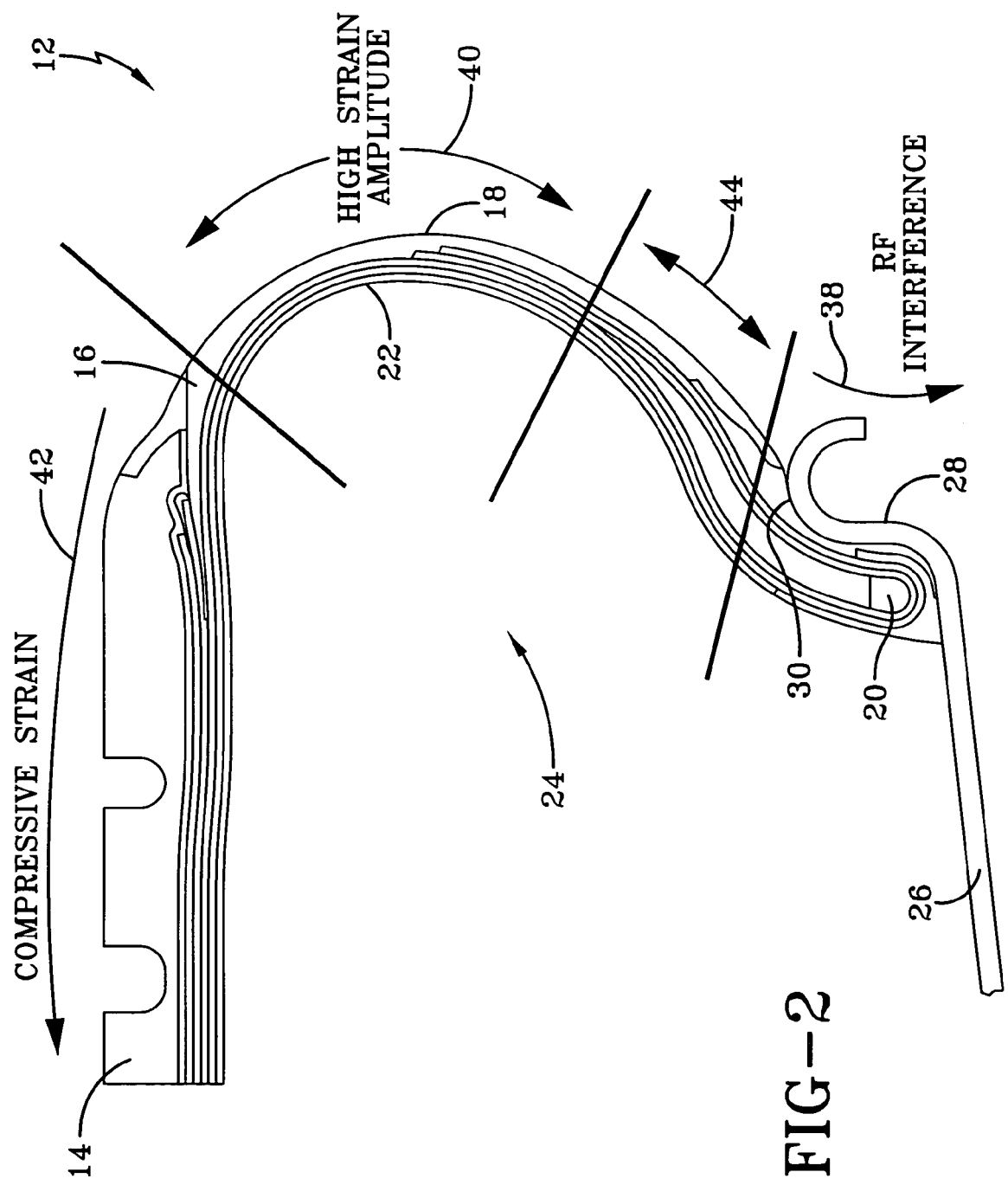
FIG. 2 is a sectional schematic of a tire mounted to a rim and illustrating alternative locations in which to mount the subject annular apparatus.

FIG. 2 illustrates a preferred location for annular apparatus 10 on a tire in accordance with the present invention. The tire 12 is mounted to a rim 26 in conventional fashion. The bead 20 of tire 12 is disposed within the rim 26 against flange 28. Upper surface 30 of the flange 28 is located above a lower edge of the tire bead 20. As will be appreciated, the flange 28 shields the lower portion of the tire 12 comprising bead 20 and defines an "RF INTERFERENCE" region 38 of the tire. A region 40 of tire 12 above region 38 at the sidewall 18 is further defined as a "HIGH STRAIN AMPLITUDE" region. As sidewall 18 flexes during operation of the tire on a vehicle, region 40 experiences a high level of strain. The region 42 located at the tread portion of the tire is referred to herein for explanatory purposes as a "COMPRESSIVE STRAIN" region. It is at region 42 that the tire 12 experiences a high level of compressive strain as the tire is operatively utilized.

In combined reference to FIGS. 1 and 2, the apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture. Adhesives commonly utilized in the industry for tire patch and repair may be employed. The location on the tire to which apparatus 10 is attached pursuant to the instant invention is region 44 in FIG. 2, located between the RF INTERFERENCE region 38 and the HIGH STRAIN AMPLITUDE region 40. It will be appreciated that region 38 would be equitable from a mechanical perspective since tire region 38 is relatively rigid, protected by rim flange 28, and, experiences a relatively low strain level during operation of the tire. From an electrical perspective, however, region 38 of the tire 12, shielded by rim flange 28, is ill suited as a location for the transponder 34.

Location of the apparatus 10 within region 40 of the tire sidewall 18 is an option. Such a location would avoid the RF Interference caused by the rim. However, the tire sidewall 18 experiences high levels of strain during operation of the tire. Consequent damage to or breakage of components affixed to the sidewall may occur. Similarly, location of the apparatus 10 at the tread region 42 of tire 12 would avoid RF Interference from the rim but the tread region experiences high compression strain during operation of the tire. Location of tire monitoring system devices in such a location would be therefore be undesirable from a mechanical perspective.

Consequently, apparatus 10 is preferably located pursuant to the invention within region 44 of the tire 12. Region 44 is generally an annular region located substantially between 10 to 30 millimeters above the upper surface 30 of the rim flange 28 when tire 12 is mounted to rim 26. Within region 44, the apparatus is free from RF Interference from the flange 28 of rim 26. Region 44 is further a relatively low strain amplitude region of the tire 12. Thus, region 44 of the tire 12 represents an optimal location for apparatus 10 that balances the need for minimal RF Interference from the rim while mechanically protecting the apparatus 10 from damage due to strain forces introduced into the tire during its operation.

Figure 3:
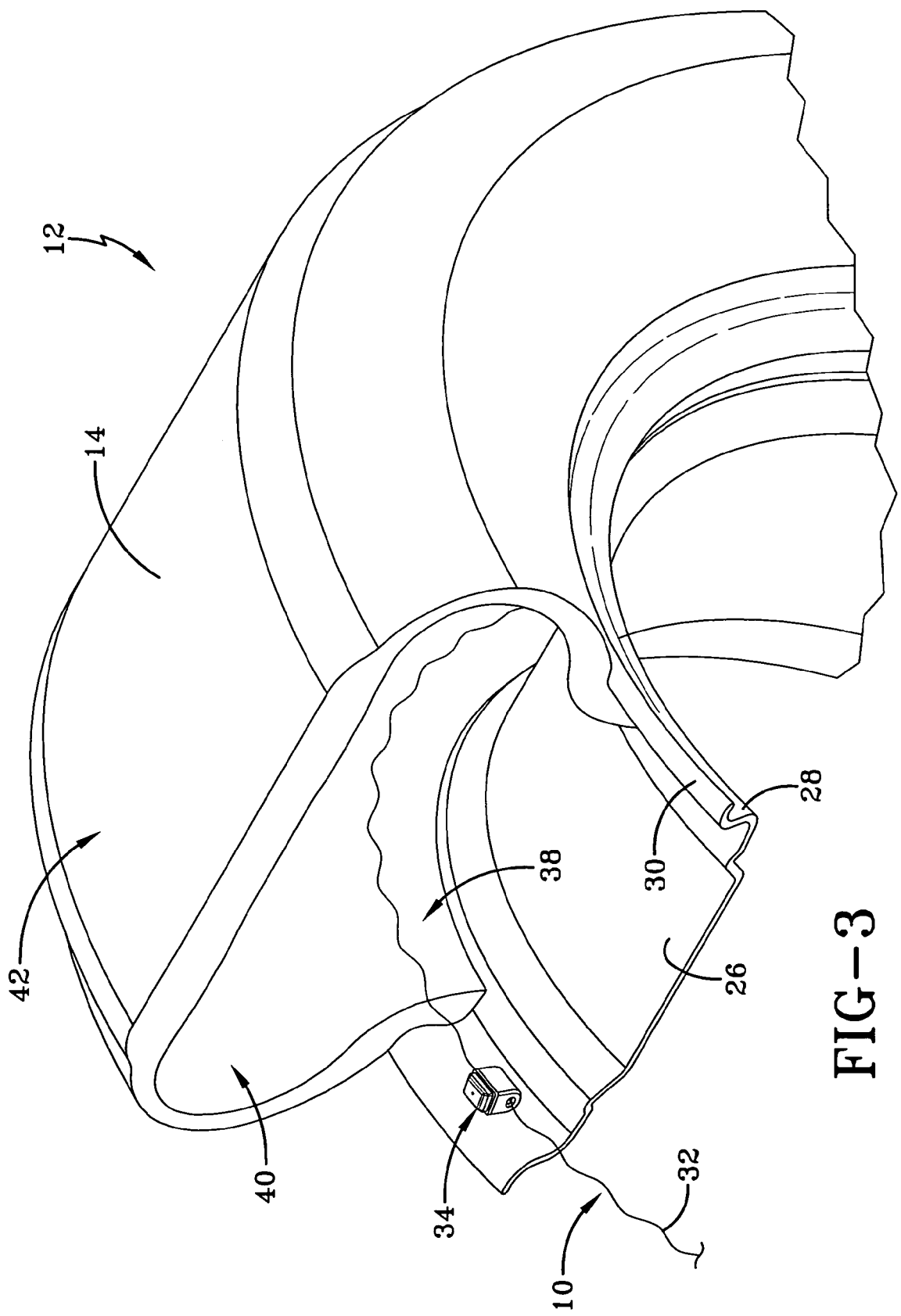
FIG. 3 is an enlarged perspective view of a tire portion having a transponder and antenna assembly positioned against a tire sidewall surface.

FIG. 3 illustrates in enlarged fashion the subject apparatus 10 positioned against the tire 12. The location of the antenna 32, again, is within region 44 described as optimal in the preceding paragraph; that is, approximately 10–30 millimeters above the rim flange surface 30 when tire 12 is mounted to rim 26. Attaching the apparatus 10 into tire 12 during its manufacture is possible pursuant to the invention but is not preferred since such a procedure would necessarily expose the transponder 34 and antenna to potentially damaging forces as the tire is formed. Consequently, it is preferable to attach the apparatus 10 to the tire 12 in a post manufacture process by adhesives or the like. The advantages of post manufacture assembly is that the apparatus 10 is spared the stress of the tire manufacturing process and the apparatus 10 may readily be removed and replaced in the event of breakage. Moreover, the unitary apparatus 10 shown in FIG. 1 may readily be retrofitted by adhesive to pre-manufactured or used tires. Finally, the annular apparatus is a unitary assembly and may be conveniently inventoried in a range of diametric sizes so as to fit various sized pre-manufactured tires.

Figure 4:
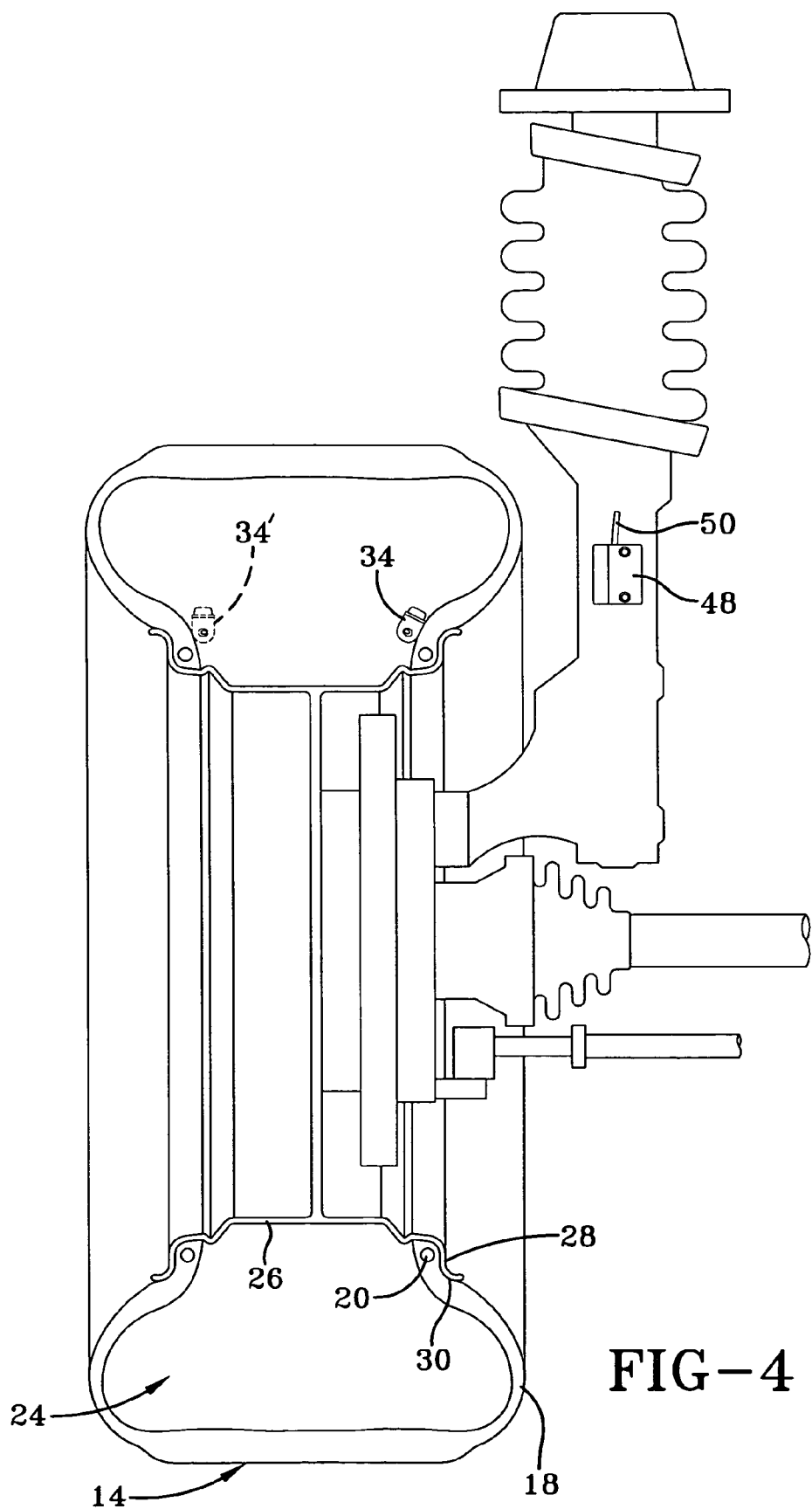
FIG. 4 is a sectional schematic view of a tire and wheel assembly mounted to a vehicle frame.

FIG. 4 shows the transponder 34 located at its preferred location on a tire 14 and exposed to the tire cavity 24. The transponder may include pressure and temperature sensors for monitoring the status of the cavity 24 and communicate such information to a remote transceiver 48 mounted to the vehicle frame 46. The transceiver 48 is positioned opposite the antenna of the apparatus 10 and is in continuous communication therewith throughout the 360 degrees rotation of the tire 14. Transceiver 48 is of a type commercially available in the industry and is electrically connected by lead 50 to conventional logic, processing and display electronics of the vehicle (not shown). As described previously, the position of the transponder module 34 is above the rim flange 28 so that RF communication between the transponder and the transceiver 48 is not impaired.

With collective reference to FIGS. 5–12, the configuration of the annular apparatus 10 will be explained in greater detail. The transponder module generally comprises a base housing 52 formed of rubber or plastic material by conventional means. The housing 52 includes opposite sidewalls 54, 56 joining along a radiused bottom surface 55 to opposite vertical end walls 58, 60. The walls 54, 55, 56, 58, and 60 define a central compartment 62. A through bore 64 extends through lower portion of the end walls 58, 60 in communication with the compartment 62.

The housing 52 further includes a cap member 68 likewise formed of conventional rubber or plastic material by conventional means such as injection molding. The cap member 68 includes an upper protrusion or "snout" 70 comprising vertical sidewalls 72 terminating at a horizontal upper surface 74. A sensor port or aperture 76 is positioned at the middle of surface 74 and extends therethrough. A flange 78 peripherally defines a lower boundary of cap 68 and provides a horizontal ledge surface 80 that merges at a right angle with the vertical sidewalls 72. The flange 78 is dimensioned to rest upon the upper end of the module base housing 52 as will be appreciated. The horizontal ledge surface 80 of cap 68 is disposed between the flange 78 and the vertical sidewalls 72. Upper sidewall portions 81 are provided that taper inwardly toward upper surface 74. The tapered profile of the cap 68 facilitates convenient and reliable manufacture of the apparatus 10.

In the illustrated embodiment, the transponder module 34 further includes a toroidal body (toroid) 82 composed of a material, such as a ferrite, having a high electromagnetic permeability. The body 82 generally comprises a cylinder having an elliptical cross-sectional configuration. The elliptical sectional configuration of body 82 serves to reduce its vertical dimension and allows for a more compact packaging of the body 82 within a transponder module. The body 82 includes a winding 84, as shown, terminated to conductor leads 86. A central through bore 88 projects through the body 82 in an axial or longitudinal direction.

A protective sleeve member 90 is further provided sized for receipt and residence with the bore 88 of body 82. The sleeve 90 comprises generally an elongate cylinder having an elliptical cross-section. The sleeve 90 further includes a circumferential sidewall 92 and an axial or longitudinal through bore 94. Bore 94 is offset relative to the longitudinal axis of the sleeve 90 so as to create a wall 95 of increased thickness at an outward side of the sleeve 90. An outwardly open longitudinal channel 96 is formed within the wall 95 as shown. The sleeve 90 is closely received within bore 88 of body 82 and winding 84 is received within the channel 96 of sleeve 90.

With continued reference to FIGS. 5–12, a circuit board 98 mounts within the central compartment 62 of the transponder base housing 52. Circuit board 98 is typically configured to comprise an electronic package 100 mounted to an upper surface 102 and may include an electronic package 106 mounted to an underside 104. The electronic packages 100, 106 are generically depicted in FIGS. 5–12 and include the transponder sensors, logic, and RF transmitting systems necessary to perform tire cavity monitoring activity. The subject invention is not transponder design specific and any one of multiple conventional transponder systems may be utilized and mounted to one or both surfaces 100, 104 of circuit board 98. The board 98 further includes lead receiving channels 108 fabricated within a board side.

Assembly of the transponder module proceeds generally as follows. The sleeve 90 is inserted within the through bore 88 of the toroidal body 82 which is then inserted into the chamber 62 of the housing base 52. Situated within chamber 62, the through bore 94 of sleeve 90 and the bore 99 of body 82 co-axially align with housing through bore 64. The winding 84 of body 82 is received within channel 96 of the sleeve 90 and leads 86 are routed upward. The number of turns in winding 84 is designed to impedance match the transponder electronics in a conventional manner. The board 98 mounts horizontally in the preferred embodiment within the housing 52 above the sleeve 90 and the toroidal body 82 through passage. Leads 86 from the winding 84 are routed into the channels 108 and electrically connected to the electronics 100, 106 on circuit board 98. The peripheral flange 78 of the cap member 68 is thereafter positioned upon the upper surface 66 of the housing 52 and the interface is sealed by application of a suitable adhesive.

Figure 6:
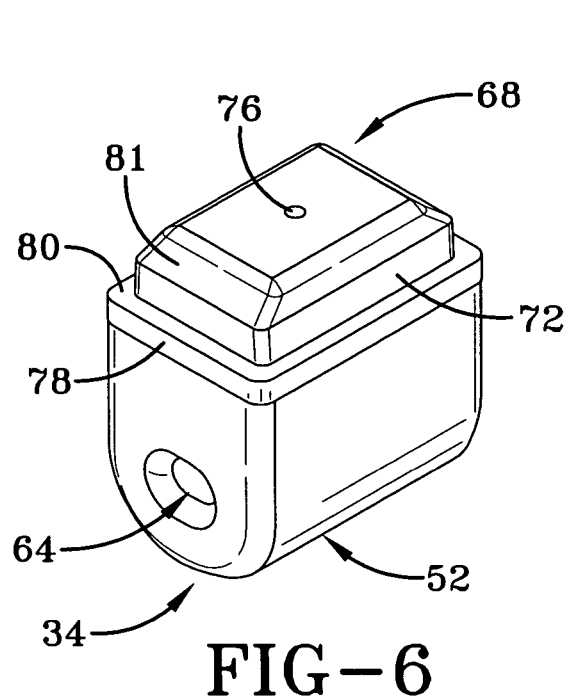
FIG. 6 is an enlarged perspective view of a transponder portion of the subject annular assembly.
Figure 7:
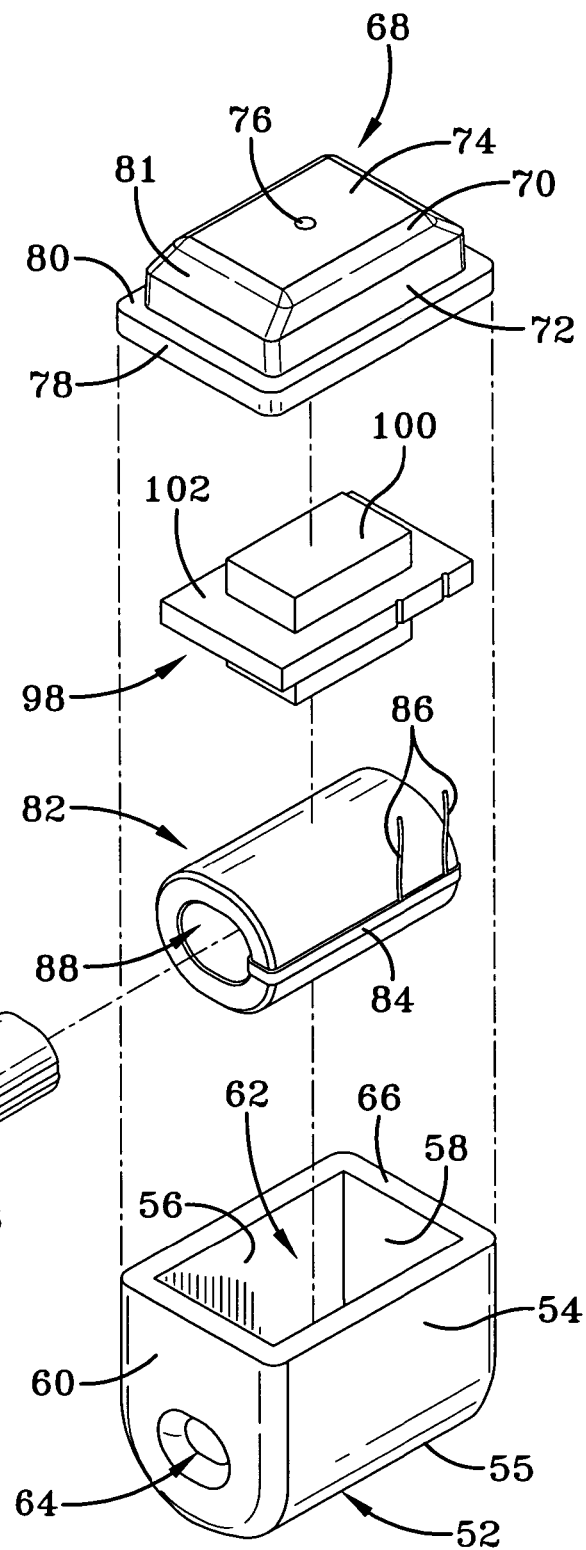
FIG. 7 is an exploded perspective view of the subject transponder module.
Figure 8:
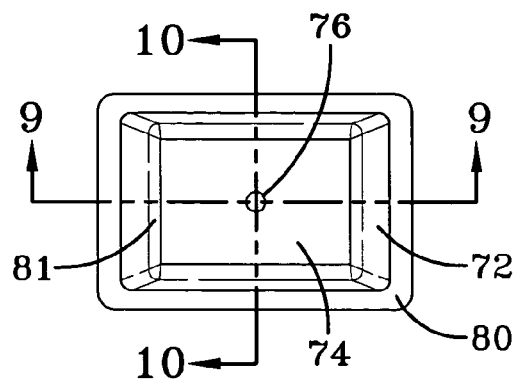
FIG. 8 is a top plan view thereof.
Figure 9:
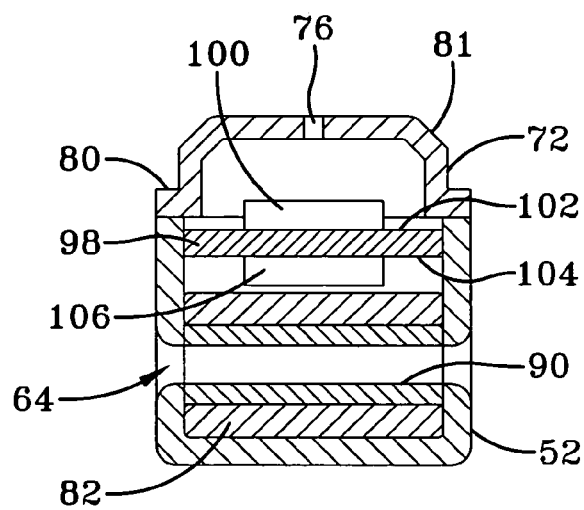
FIG. 9 is a longitudinal section view through the transponder module of FIG. 9 taken along the line 9—9.
Figure 10:
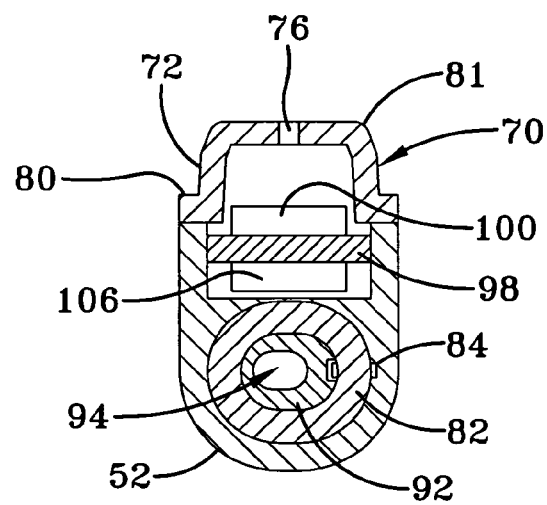
FIG. 10 is a transverse section view through the transponder module of FIG. 9 taken along the line 10—10.
Figure 11:
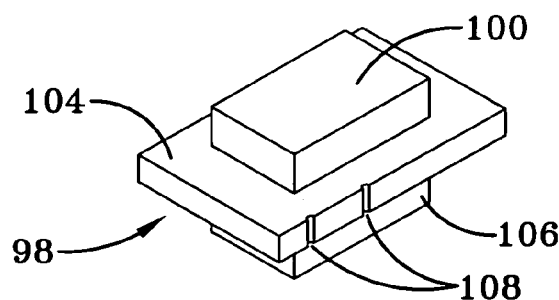
FIG. 11 is a perspective view of a representative module circuit board.
Figure 12:
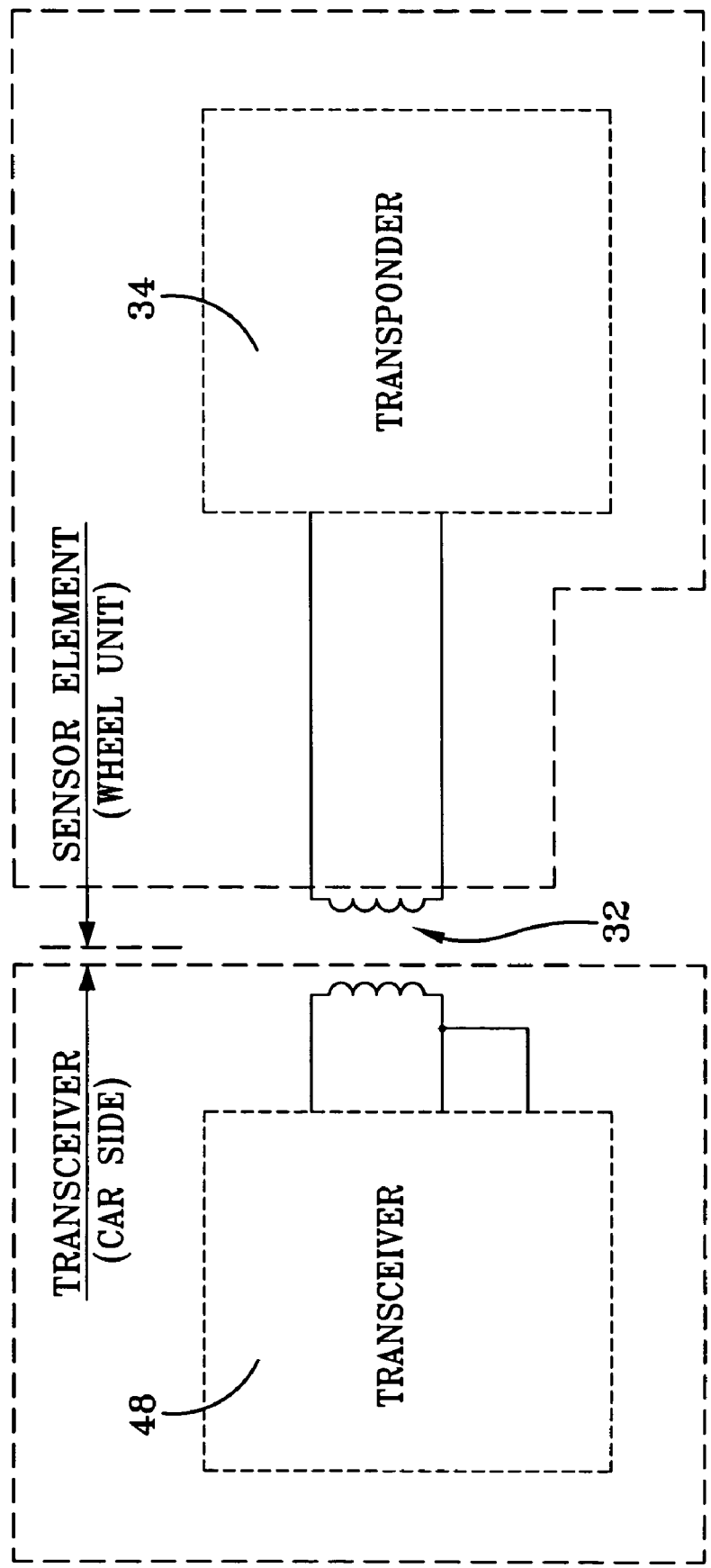
FIG. 12 is a block diagram of the transponder to transceiver coupling system.

In the assembled condition, the transponder module 34 is as shown in FIG. 6. The transponder module housing, internal assembly, and component orientation may be varied if desired in the practice of the invention. The transponder module 34 thus comprises a sealed self contained unit that includes circuit board and transponder electronics for monitoring parameters of a tire cavity such as pressure and temperature. The electronics of the transponder module 34 may further include tire identification information. The toroidal body 82 is electro-magnetically and mechanically coupled to the transponder package 24 via winding 84. Alternatively, the body 82 may be eliminated and the antenna 32 electrically coupled directly to the transponder. The resultant annular assembly would likewise be positioned in the optimum location described above in a tire. A further alternative would be to couple the antenna 32 to the transponder through a transformer of conventional configuration having primary and secondary windings.

Figure 5:
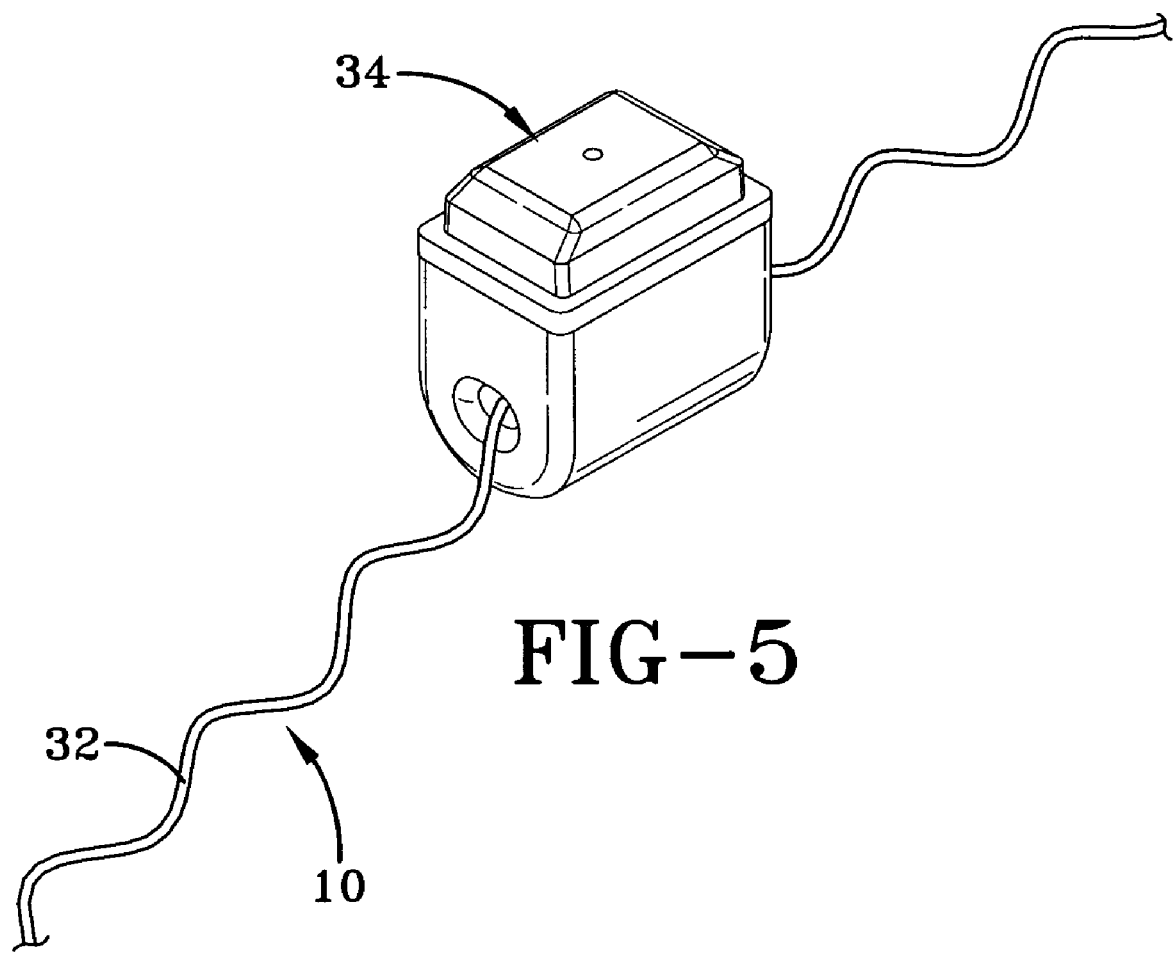
FIG. 5 is an enlarged perspective view of the subject antenna projecting through a transponder module.

The antenna 32 is routed through the transponder module 34 as seen best from FIG. 5 and comprises a continuous loop. The antenna 32 in the preferred embodiment is formed into a sinusoidal configuration, the sinusoidal shape serving to provide antenna elongation capacity with which to counter strain forces in the tire from its operation. The antenna 32 projects through bore 94 of sleeve 90, the bore 88 of body 82, and the through bore 64 of housing 52 in non-contacting manner. The antenna 32 is thus mechanically decoupled from the transponder module 34. It will be noted that the toroidal body 82 functions as a transformer in which the primary winding is eliminated. The antenna loop 32 is passed directly through the through bore 88 of the toroid 82 and couples magnetically with the body absent a primary winding. Electrical coupling occurs between the loop 32 and the toroidal body 82, and therefore into the winding 84 because the current induced in the loop antenna 32 from the transceiver 48 magnetic field creates a magnetic near the loop. The magnetic field is induced directly into the toroidal body 82 that closely surrounds the antenna loop wire(s) 32.

Such a coupling, designated herein as Direct Magnetic Coupling (DMC), affords several distinct advantages. The DMC approach allows the antenna loop to pass through the transponder package without a mechanical connection and therefore eliminates the problems with making and maintaining a connection between the loop wire and the transponder package discussed previously. The winding 84 turn ratio may be varied to accommodate optimum impedance matching. Secondly, the DMC technique provides a high energy coupling. Furthermore, the process of attaching the antenna loop to a transponder is simplified rendering the remote coupling between wire bundles or cables and transponders substantially less difficult. Moreover, the magnetic coupling between annular antenna and transponder using the DMC technique is maintained in a continuous 360 degree read and dead zones in the interrogation area are avoided.

As discussed previously, the assembly of FIG. 5 may be embedded into a tire during its manufacture, although it is not preferable to do so. Incorporation of the annular apparatus during tire build imposes substantial strain into the tire monitoring components and may result in component breakage. In a post cure state, removal of an annular assembly or any component therein may be difficult or impossible. Consequently, it is preferred that the subject annular assembly be affixed to a tire as a post tire build operation.

To do so, the antenna 32 and transponder 34 are first made into an independent assembly. An annular assembly results that is unitary and readily transported, stored, and handled. Creation of a unitary combination of antenna and transponder facilitates ease of incorporation of the annular assembly into a tire in a post build procedure. The assembly is positioned against the tire liner 22 at a location within the optimum region 44 discussed previously. The antenna 32 is at least partially embedded within a commonly available adhesive and affixed against the tire liner. Should the antenna transponder module break in transit or malfunction, the assembly 10 may be removed and replaced without damaging the tire. Moreover, the encapsulant material further serves to maintain the antenna and the toroidal body in their intended mutual orientation.

Figure 13:
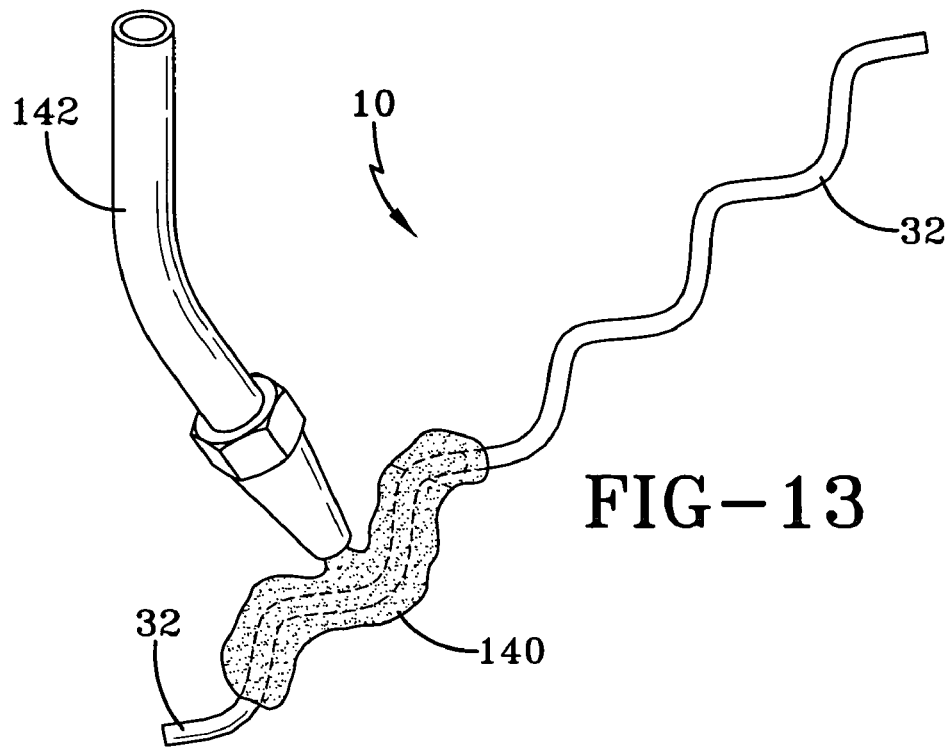
FIG. 13 is a perspective view of a portion of the antenna and showing application of an adhesive material thereto.
Figure 14:
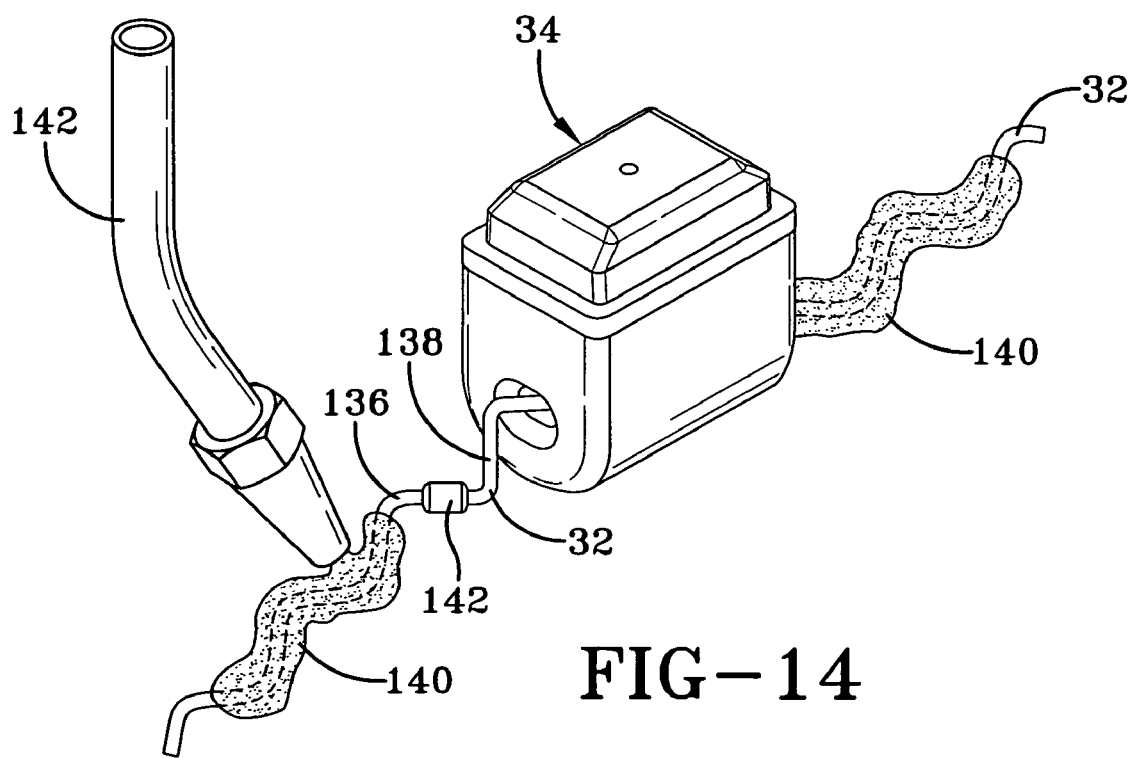
FIG. 14 is a perspective view of a portion of the antenna and the transponder and showing application of the adhesive material.
Figure 15:
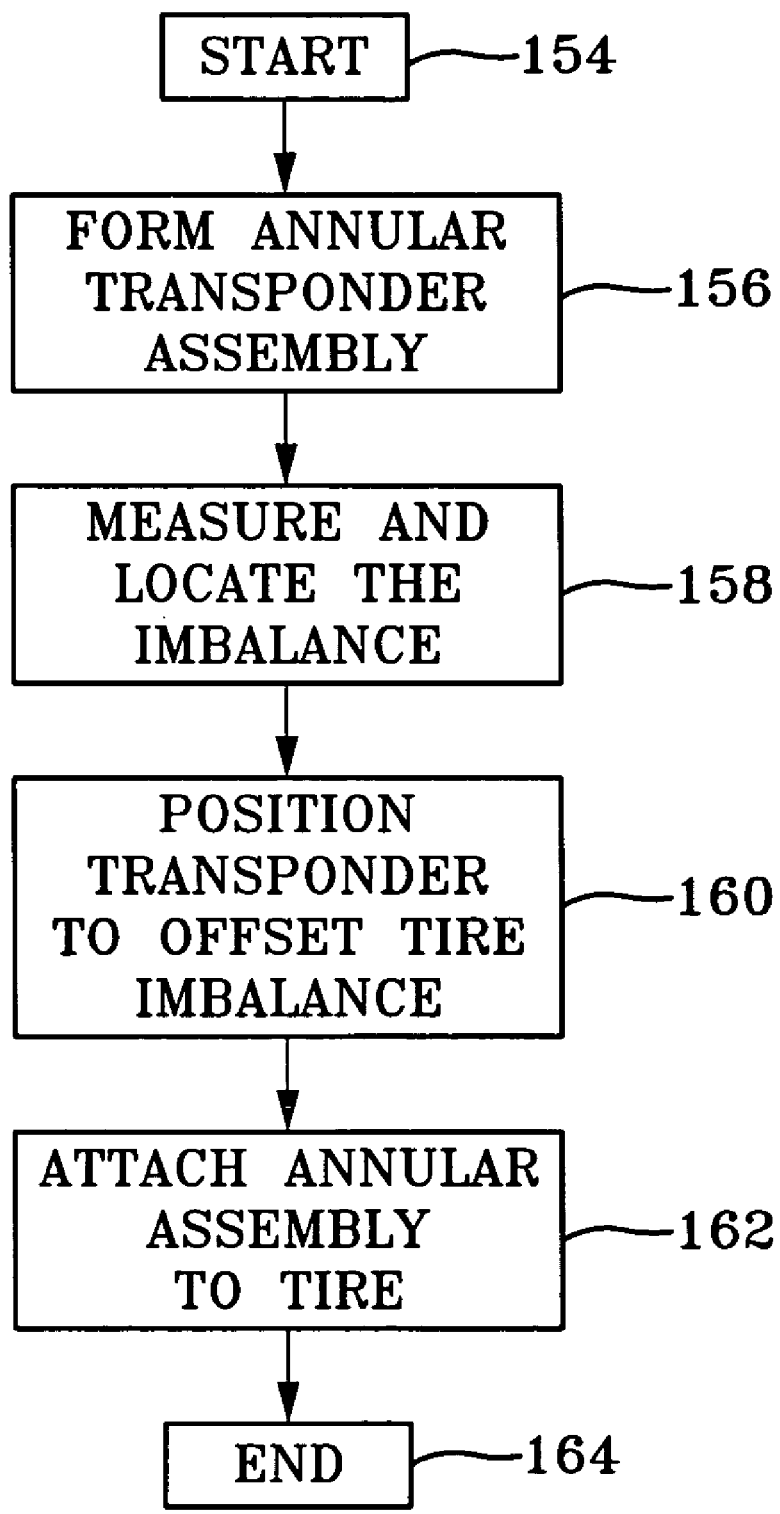
FIG. 15 is a block diagram showing the method of annular transponder apparatus installation pursuant to the invention.

Referring to FIGS. 13–15 inclusive, the method of assembling the subject annular apparatus will be understood from the following. As will be appreciated the annular antenna ring is made separately and can be installed in a vulcanized tire at a tire plant, a warehouse, a tire mounting facility, or other appropriate location. The invention contemplates selecting an appropriate antenna comprising a bare wire or wires (step 154 of FIG. 15). The wire antenna material is delivered to an assembly area where it is payed off and cut to the appropriate length (step 158), typically but not necessarily sixty inches for a sixteen inch tire. This becomes the antenna portion 32 of the ring. The wire may be of any number of various wire constructions or a composite of wire and other material. For example, the wire may be a twisted pair with textile or rubber filaments.

A first end 138 of the cut antenna wire is passed through the ferrite hole in the transponder 34. Alternative means of connecting the wire to the transponder may be used if preferred to establish the requisite magnetic coupling. Both ends 138, 140 of the cut antenna wire are then joined to provide a mechanical and electrical joint. This joint may be welded, crimped, or joined in some other way that meets the strength and electrical continuity requirements of the system. The resultant assembly comprises a 360 degree ring. Alternative means for assembling an annular antenna and transponder may be used, resulting in an annular transponder assembly.

FIG. 15 illustrates the subject inventive method in block diagram form. Beginning at starting block 153, the annular transponder is formed by any preferred means (step 156). A tire is measured in order to determine the location and magnitude of an effective region of tire imbalance (step 158). Pursuant to an aspect of the invention, a visual or other indicia may be used to mark a target region on the tire surface opposite the effective region of imbalance. The annular antenna ring and transponder assembly is then positioned against a surface location on the tire (step 160) so that the transponder acts as a counterbalance to the effective region of tire imbalance. For example, if a heavy imbalance in the tire is at zero degrees in the radial direction, then the transponder would be placed at 180 degrees in the radial direction. The transponder thus serves as a counter weight and offsets rather than reinforces the inherent imbalance of the tire. The annular transponder assembly is then affixed to the tire (step 162) by any appropriate means such as by adhesive, thus completing the assembly (step 164).

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. A method of affixing an antenna and transponder assembly to a tire surface, comprising the steps:
   a. configuring the antenna and transponder into a coupled assembly;
   b. determining an effective region of tire imbalance within the tire;
   c. positioning the coupled antenna and transponder assembly against the tire surface with the transponder oriented in a counterbalancing orientation relative to the effective region of tire imbalance;
   d. attaching the annular assembly to the tire surface.

2. A method according to claim 1, wherein further comprising the step:
   e. configuring the antenna and transponder into an annular assembly.

3. A method according to claim 1, wherein further comprising the steps of:
   marking a target location on the tire surface at a counterbalancing location opposite the effective region of tire imbalance; and
   locating the transponder of the coupled assembly at the target location.

4. A method according to claim 1, wherein further comprising the step of affixing the transponder by adhesive to the target location on the tire surface.

5. In a tire having a transponder and antenna assembly mounted to a tire surface, the improvement comprising:
   the transponder is located in a counterbalancing location to offset an effective region of tire imbalance.

6. A tire according to claim 5, wherein the transponder and antenna are assembly are configured into an annular loop.

7. A tire according to claim 5, wherein the antenna comprises at least one conductor wire formed of conductive material.

8. A tire according to claim 5, wherein the antenna and transponder are affixed to the tire surface by an adhesive material.

* * * * *